United States Patent Office 3,505,180
Patented Apr. 7, 1970

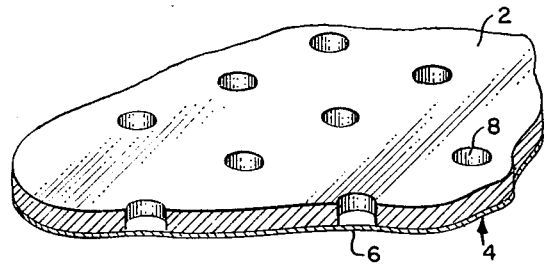
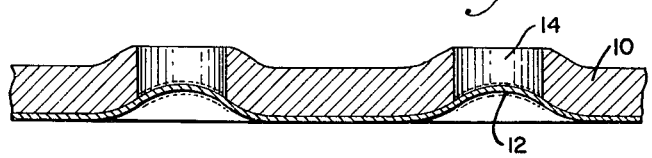
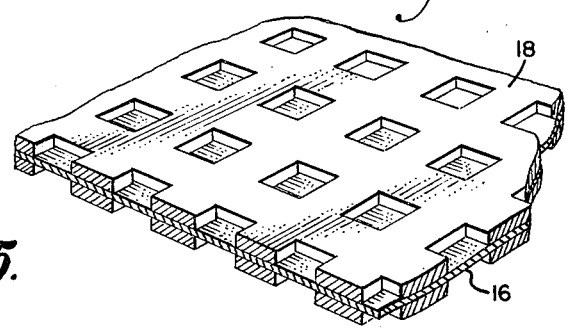
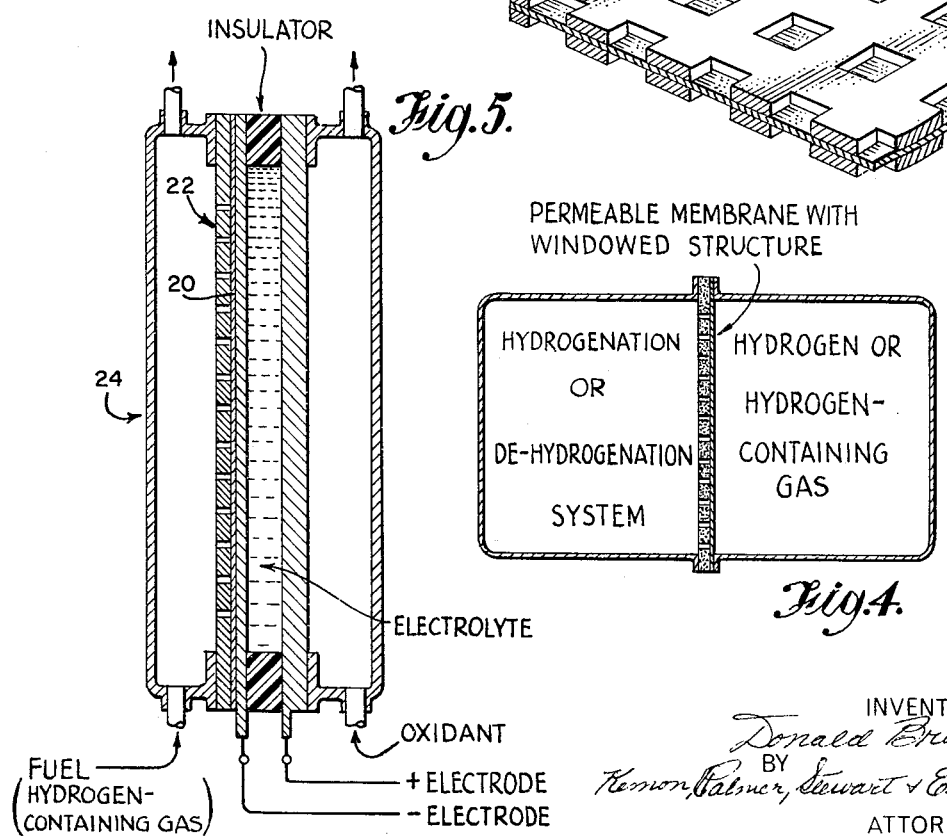

3,505,180
METHOD OF MAKING A THIN GAS
DIFFUSION MEMBRANE
Donald Brogden, Ascot Vale, Victoria, Australia, assignor to Energy Conversion Limited, London, England, a British company
Filed Sept. 16, 1964, Ser. No. 396,927
Claims priority, application Great Britain, Sept. 20, 1963, 37,198/63
Int. Cl. B29c *17/08;* C23b *5/50;* H01m *27/00*
U.S. Cl. 204—35                        14 Claims

ABSTRACT OF THE DISCLOSURE

Sheet-like gas permeable membrane units are formed with a metallic base sheet having a multiplicity of holes that are covered by gas permeable membrane material fixed to the base sheet closing the holes except for the specific diffusion that may take place through the membrane material, e.g., a base sheet of nickel having a pattern of small holes through it and a very thin electrodeposited layer of palladium covering the holes, the unit being permeable to hydrogen but impermeable to other gases.

---

There are increasing numbers of requirements for the production of very thin metal membranes for various purposes. Thus it is well known that some precious metals have exceptional chemi-sorption properties; palladium sheet, for instance, acts to adsorb hydrogen at one face and to desorb it at the other so as to permit passage of hydrogen through the sheet. Membranes of palladium metal are useful therefore, for instance, in purifying hydrogen supplies by permitting passage of hydrogen therethrough, but preventing passage of other gases or vapors. An outstanding property of any precious metal is, however, its high cost and the use of membranes of these materials, therefore, involves high expenditure; but expense can be reduced by the use of thinner membranes.

It may sometimes happen that the use of thinner membranes would also have other advantages.

For example, the gas permeability of a membrane of a given material may be considerably enhanced by reduction of thickness and certain materials might be brought within the bounds of possible use as permeable membranes if they could be made thin enough.

Obviously if one could go on reducing the thickness of a material by mechanically working it, a point of economic acceptability or of possible use as a membrane should be reached in any particular case, but as thickness decreases it becomes more and more difficult to support the material without the use of ancillary support members: and with ultra-thin membranes difficulty may even be experienced with the support means. A further difficulty arises in that it becomes impossible to produce thin membranes of reasonable surface by this means, without the presence of "pin holes."

It is an object of the present invention to provide means incorporating such membranes in which these difficulties are overcome.

In accordance with one aspect of the invention, in means incorporating a thin metal membrane, the membrane effectively takes the form of a plurality of closures for passages through a supporting structure. The size of the closures will depend to a large extent upon their strength. Thus, in general, if it is flat, the thinner the membrane, the smaller would one expect the area of each closure to be.

In accordance with another aspect of the invention, a thin metal membrane structure comprises sheet-like means with openings therein which are bridged by a membrane or membranes of said metal so as to close the openings. The said openings may be of simple geometric shape, or they may be of indeterminate shape, provided there is continuity from one surface to another of the structure.

In one particular structure in accordance with the invention, a base of one material is formed with perforations which are closed by indivadual membranes of the requisite metal.

In embodiments of the invention according to any of its aspects, the membranes may be separately formed and then attached to the supporting structure (for example by mechanical or thermal bonding or by use of adherents) but preferably they are deposited by an electrochemical process or by any other process which produces a normally non-porous deposit, or one that may be made non-porous, for example by being worked, such as by rolling. The arrangement may be such that the membrane material is sandwiched between parts of the supporting structure but even in this arrangement the sandwiched portion may be of a deposited nature. Additionally the membranes may be those parts of a larger membrane which may extend also over parts of the supporting structure surrounding the said openings, or the individual membranes may extend over adjoining parts of the surface of the supporting structure.

Moreover some, or all, of the said openings may be formed in the supporting structure only after assembly or deposition of the membranes on and/or in the structure. Thus a base material of one metal in sheet form may be plated on one surface with membrane metal and the other surface may then be subjected to a selective etching operation arranged to remove parts of the base material while leaving the plated metal unaffected, so as to leave holes in the base material which are blocked by said plating.

A structure may be prepared by rolling or otherwise working down support structure material together with membrane material, and the membrane material may be sandwiched between parts of structure material. If the structure material is already perforated, there may be no necessity for further steps to be taken to form openings in the support structure; otherwise it may be necessary to perform a selective etching operation, as referred to above, possibly at both faces, to expose areas of membrane material.

Where the membrane material is of a deposited nature, any rolling or other working operation that may be necessary for bonding the materials together or for any other reason may be effected after the deposition process as desired and, where an etching process is involved, before or after such etching process has been completed or partially completed.

According to another feature of the invention, a membrane structure comprising thin membranes closing openings in a support material is subjected to heat treatment sufficient to raise the diffusion properties of the membrane material. Thus, if the membrane is of palladium supported by a nickel structure, it has been found that heat treatment at 800° C. for five minutes in an inert atmosphere resulted in three-fold improvement of hydrogen diffusion through the palladium, over and above a similar arrangement which had not been so treated.

In certain cases it may be desirable to impress a raised or indented pattern either on the supporting structure before deposition of the membrane material or on the combined or bonded material itself after its formation. The reason for such impression will be apparent from the description below.

Two uses for means in accordance with the invention are (a) for the purification of an impure gas supply-pallidium being used, for example, for hydrogen purification and possibly platinum or silver for oxygen, and (b) for use with, so-called, fuel cells. In fact, of course, the first use may arise in connection with the second where, for example, an impure source of hydrogen is used to feed a conventional Bacon cell.

It is advantageous that a structure in accordance with the invention may function directly as a fuel cell electrode if the supporting structure is of suitable material. The presence of the membrane may be used to additional advantage if a reformer catalyst can be associated with it, since then it may be used as a fuel electrode where methanol or ethanol, or other reforming fuel, is used, the membrane material serving to permit the hydrogen so formed to diffuse through to the electrolyte side of the electrode.

In order that the invention may be better understood, further details will be given of structures, and methods of making them, as applicable to fuel cell electrode structures, but similar structures may be used for other purposes as will be evident to those skilled in the art.

Reference is made to the accompanying drawing in which:

FIGURE 1 is a fragmentary perspective view of one form of permeable membrane of the invention.

FIGURE 2 is an enlarged, fragmentary sectional side view of another embodiment of the new permeable membranes.

FIGURE 3 is a fragmentary perspective view of yet another form of the new permeable membranes.

FIGURE 4 is a diagrammatic sectional view showing a use of one of the new membranes.

FIGURE 5 is a side sectional view of an electrolytic cell comprising one of the membranes of the invention.

FIGURE 1 is a fragmentary perspective view of one

The use of palladium is taken as by way of example and it will be understood that substantially similar general considerations may apply whatever the metals used.

Thus, for example with, reference to FIG. 1, a sheet of nickel or other suitable material 2 having a thickness sufficient for handling purposes and ultimate support is electro-plated on one side with a thin layer of palladium 4 and this need only be a matter of less than 10 microns thick. A resist material, which may be in the form of a lacquer or even a suitable metal coating, is applied to the unplated side of the sheet so as to leave suitably shaped uncovered spaces on that side. The resist may be applied manually, or even automatically, for instance by a conventional technique. The sheet is then subjected to a chemical, or electrochemical, etching operation so that the exposed base material is etched away while the resist-covered base material remains, the etchant and/or conditions being such that the palladium is not attacked. On completion of this etching operation, and after suitable rinsing and cleansing treatment, the resist material may be removed, and the resulting structure as seen in FIG. 1 is a base member 2 and supporting a number of very thin palladium membranes 6 closing holes 8 spaced over the surface of the base member. While the palladium membranes can be so thin that they could not be readily handled separately, the base member provides adequate handling facilities as well as forming a suitable support for mounting. The individual membranes so produced are, of course flat and there is obviously a need to limit their size, particularly since palladium expands when absorbing hydrogen and contracts again when losing it, thus giving a tendency for the membrane to disrupt; additionally, it is usually necessary to provide for a pressure differential across the membrane, as well as to raise its temperature, to enhance the passage of hydrogen therethrough.

In the particular case in point, there is a possibility of increasing the strength of the membrane by modifying the absorption characteristics of the palladium. Thus it is known that alloying silver with the palladium had this effect and membranes of the alloy could be produced in accordance with the invention in a number of ways. Thus the alloying metals could be deposited as separate layers in contact with each other on the base structure, or they might possibly be deposited simultaneously, or the alloy itself might even be deposited directly on the structure; heat treatment would of course be necessary where the metals are separately deposited, in order to form the alloy and it is preferable that the alloy should be as homogeneous as possible. As a corollary, it may be mentioned that there may be no need to deposit alloying metal, if the structure material itself comprises alloying metal, since the heat treatment will cause alloying of the plated metal in the same way but, even so, it is possible that it may be advantageous to deposit the structure metal additionally, and the membrane metal may be deposited as a sandwich between the structure itself and the deposited structure material.

The formation of alloy membranes in general in this way need not be for the same reason as described above for palladium. In fact, according to another aspect of the invention, alloy membranes are produced in situ in a membrane structure by this method irrespective of the use to which they are to be put. It will be seen that alloying by this thermal treatment is rendered particularly effective by the possibility of extreme thinness of the membranes.

It may happen, however, that even in the case of the alloy membrane, distortion of a planar membrane still occurs, in which case it may be desirable to make the individual membranes of curved form to enable them to accommodate the dimensional changes due to absorption and desorption of gas; particularly if they are part-spherical, they may also be better able then to withstand any pressure differential across the membrane which may arise in use. It may be, of course, that surfaces of other curvature may be sufficient.

A structure as shown in FIG. 2 comprising curved membranes may be produced by the following process:

Before the base material is subjected to the depositing process, a number of indentations are made in it, for instance by means of a pressing die to produce a pattern of part-spherical indentations: such a die may be conveniently formed by ball bearings retained on a flat surface—for example, 105 ball bearings of 1 mm. diameter were arranged in a two-dimensional close packed array in a recess of about 1 cm. square formed in the end of a die block the projection from the end of the die being about 0.5 mm. and by using a mating die formed by forcing the die block into soft copper, indentations of about 0.07 cm. diameter were produced in a nickel sheet of 0.0152 cm. thickness.

The side of the base material having the raised pattern is coated with resist material and membrane material is deposited to the required thickness on the other side. Then by lightly rubbing the resist-covered side with a flat piece of abrasive paper, resist material is removed from the highest spots of the pattern to expose the base material at these spots. An etching process then remove the base material at these spots and the membrane material is exposed as films 12 covering apertures 14 at the base of each indentation. The membranes follow the form of the indentation and are therefore curved.

The form and spacing of the membranes can be arranged to suit any particular need and the size of the membranes will depend upon their thickness and upon conditions under which the structure is to be used.

Satisfactory products in accordance with the invention have been obtained in the following manner.

EXAMPLE 1

A disc, 2.5 cm. diameter, was cut from silver sheet 0.0076 cm. thick.

One side was coated with lacquer and the other side cleaned by rubbing with polishing alumina and water.

The disc was then immersed in a plating bath and palladium electro-deposited on the cleaned surface until the thickness of palladium reached 0.00038 cm.

The plating bath contained, in 1 liter,

| | |
|---|---|
| Palladium diamino dinitrite, g. | 9 |
| Ammonium nitrate, g. | 100 |
| Sodium nitrite, g. | 10 |
| Ammonia solution S.G. 0.88, mls. | 50 |

The bath was used at 70° C. at a pH of approximately 9. A platinum anode was employed. Cathode current density was 10 ma. per sq. cm. Fairly vigorous stirring was used during deposition which took about fifteen minutes.

After plating the lacquer was removed with acetone and fresh lacquer applied to the unplated face. The lacquer was applied so as to leave a hole in the center 1 cm. in diameter. A grid was then ruled with lacquer over this hole, the lines of the grid being approximately 0.5 mm. thick and the space between the lines being approximately 0.5 mm. wide. Two sets of lines crossed at right angles.

The disc was then made the anode in a 5% solution of nitric acid and a current of 100 ma. passed for four minutes and forty-five seconds. After this, the lacquer was removed.

The final product could be described as a silver disc 2.5 cm. in diameter and 0.0076 cm. thick having a 1 cm. diameter hole in the center covered by a palladium membrane 0.00038 cm. thick supported on a sliver grid.

EXAMPLE 2

A disc 2.5 cm. in diameter was cut from nickel sheet 0.0152 cm. thick. A small tag was left on to facilitate handling.

A pattern of indentations was pressed into the nickel by means of the special die referred to above.

After indentation, both sides of the nickel disc were cleaned with alumina and water and the side with the raised bumps lacquered. The indented side then had 0.00028 cm. thickness of palladium electrodeposited on it using the same plating bath and conditions as described in Example 1 except that the plating time was reduced to about eleven minutes.

It was then rinsed and transferred to a silver plating bath where silver 0.00010 cm. thick was deposited on top of the palladium.

The silver plating bath contained, in 1 litre,

| | |
|---|---|
| Silver cyanide, g. | 45 |
| Potassium cyanide, g. | 95 |
| Potassium carbonate, g. | 15 |
| Engelhard brightener No. 1, mls. | 30 |

After plating the disc was rinsed and dried and more lacquer applied so that all of the specimen was covered except for the end of the handling tag where electrical connection could be made.

The unplated side of the disc, i.e., the side with the bumps, was rubbed with a flat piece of abrasive so that the lacquer was removed from the highest spot of each bump.

The die was then made the anode in a solution containing 10% by volume of concentrated hydrochloric acid and a current of 40 ma. passed for seventy-five minutes. It is important at this stage that the disc does not reach a sufficiently positive potential for the palladium to be attacked. It had been found by previous experiment that 40 ma. was a safe current to use with this particular design of specimen.

After etching, the specimen was rinsed and the lacquer removed with acetone.

It was then heated to 800° for five minutes in oxygen free nitrogen.

It is to be understood that a base material in sheet form used as the supporting structure in accordance with the invention need not be of planar formation; it may be for instance of tubular form or even of dished form.

Other modifications within the scope of the invention will be evident to those skilled in the art.

It should be noted that by suitable indentation procedure it is possible to arrange that the bottom of an indentation, and therefore, the membrane itself after processing, remains within the thickness of the support structure; and by this means it is possible for the membranes to be protected to a certain extent from mechanical damage due to accidental contact of the structure with other bodies.

Another advantage of membrane means according to the invention, or use to which it may be put, arises out of the possibility of applying reforming catalyst locally to the membrane parts, this serving not only to locate the catalyst and to conserve it, but also to reduce the quantity needed for any given area of electrode.

A structure in accordance with the invention is also envisaged where the base material itself may be of the nature of a chemical or electrochemical plate or deposit; the support structure may be in the form of a screen of nickel plate, say about 30 gauge, which is perforated with small holes, say 0.024 in. dia., so as to give an open area of about 50 percent, and a palladium foil, which can be as little as one-quarter of one-thousandth of an inch, may then be roll-welded onto the nickel screen. Here again, as seen in FIG. 3, the membrane material 16 may form the center member of a sandwich structure 18.

According to a further feature of the invention, where the selective etching technique is used, resist material may be applied on both sides of the structure. This probably would involve accurate application of the resist material; but this is by no means out of the question, using conventional methods, even where very finely perforated structures are required, as for instance to accommodate flat membranes of the small size that may be necessary to counteract the tendency to disrupt, described above.

A further feature which may yield beneficial results in use, is that the surface of the base member could be roughened before the deposition of the membrane material so that, after the etching treatment, the membrane itself presents a rough surface for the purpose, for example, of increasing the surface area of the membrane.

It wil be appreciated that membrane structures in acordance with the invention may be activated and that conventional activation methods may be used, for example by application of metal blocks to the membrane surface; nevertheless modified techniques are not ruled out. The membrane structure in accordance with any of the features of the invention will be seen to be such that both surfaces of the membrane material are accessible for activation if desired.

Other uses for membrane structures of the kind described in accordance with the invention may arise in the chemical industry. Thus, the membrane structure may be made of sufficiently robust nature as to withstand rough handling conditions to which it may be subjected, and yet not lose the benefit of efficiency with relative cheapness.

Such uses as illustrated in FIG. 4 may arise in connection with hydrogenation or dehydrogenation processes. In either of these processes, it is evident that, as the result of the diffusion phenomenon, chemical activity of a reactant diffusing through the membrane structure may be higher at the membrane surface.

According to a still further feature of the invention as seen in FIG. 5 a diffusing membrane structure 20 is used as an electrode 22 in an electrolytic cell 24 the other side of the membrane being in communication with a system requiring supplies of a gas generated by the cell. Then, even if the said system is operating under high pressure, the electrolytic process suffices to cause continuous diffusion of the gas into the system.

According to yet a further feature of the invention, in a membrane structure in which one or more thin membranes of one metal or alloy are arranged to bridge holes in a support member of another metal or alloy, the choice of metals may be such that the metal or alloy of the support member diffuses to a certain extend to modify its properties in the region of the connection between membrane and support member. By this means, a material of modified properties may result such as mechanically to take up any differential expansion between the metals and/or alloys of the support and membrane. Alternatively, the modifications may be such as to prevent adsorption of gas by the modified part of the membrane and to prevent disruption from this cause in the region of contact with the support. In the case of a nickel support and very thin layers of palladium heating to approximately 800° C. for a few minutes in an inert atmosphere has been found to have the effect of poisoning the edge portion of the palladium, to yield the said modified property.

I claim:

1. A method of producing thin selectively gas permeable membrane structures of metal exhibiting selective gas permeability which comprises providing a substantially mechanically inseparable combination in sheet form of metallic support structure means and at least one thin layer of said metal and selectively removing by etching support structure material from discrete parts of said combination so as to leave a structure in which a multiplicity of gas passages through the support means are each covered by said layer of said metal.

2. A method as claimed in claim 1 wherein said metal is selected from the group consisting of palladium, platinum, silver and alloys thereof.

3. A method as claimed in claim 1, for producing a gas permeable membrane structure in which said metal is an alloy, wherein the alloying metals of the thin layer of said metal are deposited as separate layers in contact with each other on the support structure means and are subsequently subjected to alloying treatment.

4. A method as claimed in claim 1 for producing a gas permeable membrane structure in which said metal is an alloy, wherein the alloying metals of the thin layer of said metal are deposited simultaneously on the support structure means and are subsequently subjected to alloying treatment.

5. A method as claimed in claim 1 for producing a gas permeable membrane structure in which said metal is an alloy, wherein the alloying metals of the thin layer of said metal are deposited directly on the support structure means in the form of the alloy.

6. A method as claimed in claim 1 wherein the material of the support structure means comprises metal that will alloy with said metal and wherein the structure is subjected to treatment to cause alloying of the membrane material and said metal.

7. A method as claimed in claim 1, wherein the support structure means is provided with an impressed pattern and said metal is subsequently deposited thereon.

8. A method as claimed in claim 1, wherein resist material is applied to the support structure means in such a form as to leave parts of the support structure means exposed for said etching.

9. A method as claimed in claim 1 and wherein the thin layer of said metal is in the form of a deposit on the support structure means, the surface of the support structure means is roughened before deposition of the metal, nad there is selective removal of the structure support means by an etching process, resulting in the surface of the closures of said gas passages having a rough surface for the purpose of increasing the surface area thereof exposed.

10. A method as claimed in claim 1 wherein the membrane structure is subjected to heat treatment after the selective removal of support structure material, said heat treatment being sufficient to raise gaseous diffusion properties of the metal forming the closures of said gas passages.

11. A method as claimed in claim 10, wherein the metal contains at least a high proportion of palladium and the support material is nickel, and wherein the structure is heat treated at about 800° C. for a short time in an inert atmosphere.

12. A method as claimed in claim 11, wherein the metal is an alloy of palladium and silver.

13. A method of producing a thin gas membrane sandwich structure having as a center member a layer of metal exhibiting selective gas permeability and as at least one of the surface members a layer of metal formed by electrochemical plating which comprises providing a thin support member metal sheet, electrodepositing on said sheet a thin center layer of said selective gas permeability metal, electrodepositing on the exposed surface of said center layer a surface layer of support member metal, and selectively removing by etching discrete parts of the surface members of the resulting sandwich structure so as to leave a sandwich structure in which a multiplicity of gas passages through each of said surface members expose corresponding areas of said center metal layer.

14. A method as claimed in claim 13 wherein said surface members are made of silver and said center layer is made of palladium.

References Cited

UNITED STATES PATENTS

| 1,174,631 | 3/1916 | Snelling | 55—158 |
|---|---|---|---|
| 2,607,825 | 8/1952 | Eisler | 204—143 |
| 2,749,293 | 6/1956 | Wahlin | 204—73 |
| 2,958,391 | 11/1960 | Rosset | 55—158 |
| 2,969,315 | 1/1961 | Bacon | 136—86 |
| 3,092,517 | 6/1963 | Oswin | 136—86 |
| 3,192,136 | 6/1965 | Reid | 204—143 |
| 3,206,333 | 9/1965 | Ehrenfeld | 136—86 |
| 1,750,418 | 3/1930 | McFarland | 204—143 |
| 2,711,389 | 6/1955 | Beach et al. | 204—37 |
| 2,719,797 | 10/1955 | Rosenblatt et al. | 204—37 |
| 2,805,192 | 9/1957 | Brenner | 204—37 |

WINSTON A. DOUGLAS, Primary Examiner

H. FEELEY, Assistant Examiner

U.S. Cl. X.R.

136—120; 156—8